April 21, 1931.  L. HOLLAND  1,802,254
LANDING OR DISPATCHING DEVICE FOR AEROPLANES
Original Filed Aug. 16, 1928  4 Sheets-Sheet 1

Inventor:
L. Holland

April 21, 1931.  L. HOLLAND  1,802,254
LANDING OR DISPATCHING DEVICE FOR AEROPLANES
Original Filed Aug. 16, 1928   4 Sheets-Sheet 2

Inventor:
L. Holland,

April 21, 1931. L. HOLLAND 1,802,254
LANDING OR DISPATCHING DEVICE FOR AEROPLANES
Original Filed Aug. 16, 1928   4 Sheets-Sheet 3
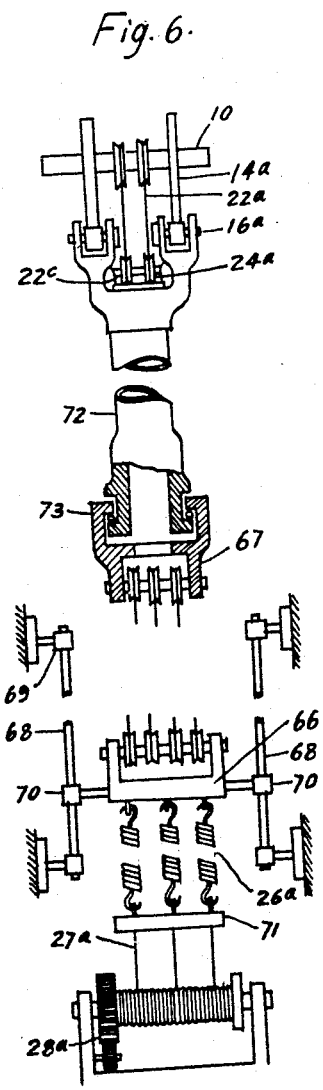
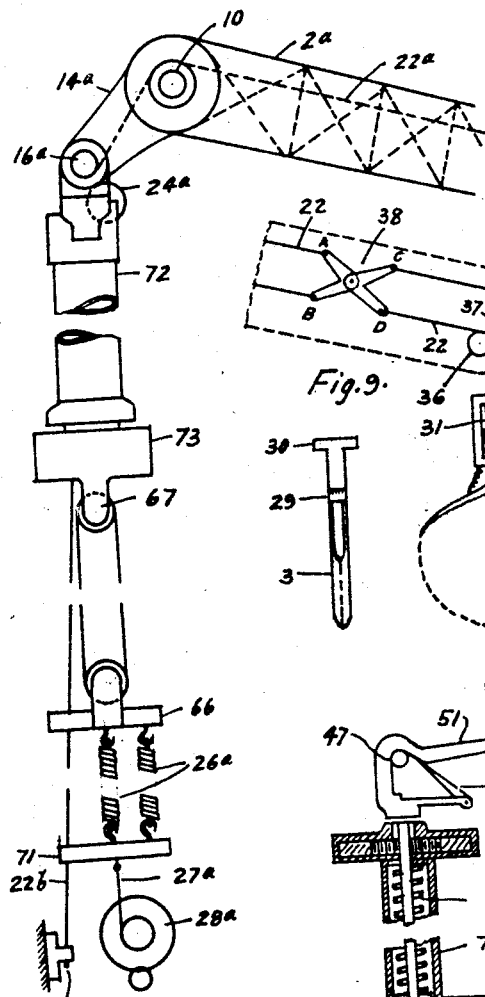
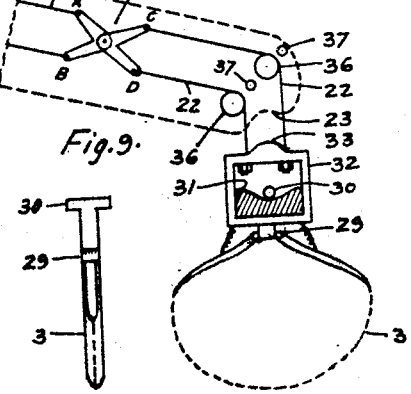
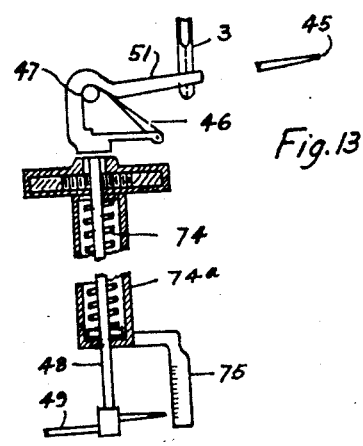
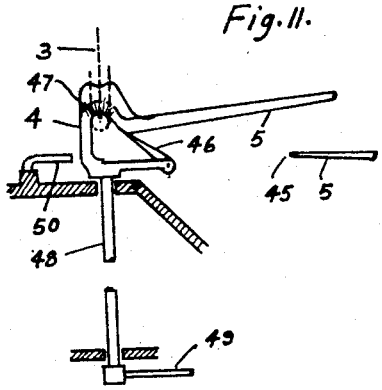
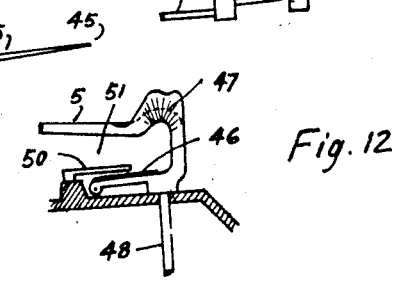
Inventor:
L. Holland,
by
Langner, Parry, [illegible]
Att'ys.

April 21, 1931.   L. HOLLAND   1,802,254
LANDING OR DISPATCHING DEVICE FOR AEROPLANES
Original Filed Aug. 16, 1928   4 Sheets-Sheet 4

Inventor:
L. Holland, by Langner, Parry, Card & Langner
Att'ys.

Patented Apr. 21, 1931

1,802,254

UNITED STATES PATENT OFFICE

LIONEL HOLLAND, OF CALCUTTA, INDIA

LANDING OR DISPATCHING DEVICE FOR AEROPLANES

Original application filed August 16, 1928, Serial No. 300,078, and in India June 12, 1928. Divided and this application filed July 6, 1929. Serial No. 376,443.

This invention, a division of my co-pending application Ser. No. 300,078, filed Aug. 16, 1928, relates to landing and/or dispatching apparatus for aeroplanes or the like.

The object of the invention is to provide apparatus which can be used to enable the landing of or dispatch of aeroplanes to be effected from positions in which the aeroplane could not possibly be landed or could not take off unless some suitable apparatus was provided.

The main object is to provide means whereby aeroplanes may be landed or dispatched from the centre of a city from, for example, the top of a high building, or from any other place where the necessary ground is not available for an aeroplane to take off from or to land on.

The advantages of apparatus or means for this purpose will be obvious as it would allow of landing and dispatching stations to be provided in the heart of a congested city, thus enabling passengers to alight or to start on a journey without the trouble, expense and delay of having to go miles away to a suitable aerodrome.

The apparatus which is about to be described is not only suitable for use on the top of a building but could also be used on a ship or pontoon, or in any desired position where the necessary ground, or space of water, does not exist for ordinary landing and taking off purposes but where the neighbourhood is not restricted by numerous high trees or buildings in the close proximity.

The present invention is for improved apparatus for launching and landing aeroplanes and mainly relates to the means whereby the shocks in landing may be reduced to a minimum owing to spring or extensible means which are provided to allow the attachments to extend. The invention also at the same time includes such elastic or resilient cushioning means which in launching may be used automatically to pay out the aeroplane attaching gear so as to reduce the centrifugal stresses in launching.

The invention consists in apparatus for enabling an aeroplane to be launched or landed in a restricted space, having a mast or tower and an arm which is adapted to rotate or to be rotated about the axis of said mast or tower, and aeroplane attaching or engaging means carried by said arm, characterized by the said attaching or engaging means being capable of extending outwards under spring or elastic restraint when a pull or centrifugal stress of suitable or predetermined amount is applied thereto, thereby substantially to increase the normal radius of the said arm when appropriate outwardly directed force is applied thereto.

In launching or landing apparatus in which a mast or tower with an arm carrying an aeroplane engaging device thereon is provided, which arm is adapted to rotate or to be rotated about, or with the axis of said mast (or tower) the invention covers broadly the attachment of the said engaging device to the end of said arm through the medium of a cable or other flexible means extensible against a spring or other resistance. In this connection by a means extensible against a resistance it is intended to cover any suitable known means, for example springs, or combinations of springs, hydraulic pneumatic or like cylinders with pistons working therein, or any means capable of giving a long stroke extension or one capable of magnification to give under a gradually increasing resistance a considerable extension to the aeroplane connection.

The invention thus includes in apparatus for enabling the dispatching and/or landing of aeroplanes to be effected having a mast or tower with an arm adapted to rotate or to be rotated about or with the axis of said mast or tower, the provision of an aeroplane engaging device upon the arm attached to the arm through the medium of a cable or other flexible means extensible against a spring or the like, or against other resistance, which, whilst it enables the said engaging device to extend or to be drawn out, only permits said extension to occur against the resistance of an elastic or other force which increases as the engaging device draws out.

The invention further includes apparatus for enabling an aeroplane to be dispatched or landed in which a mast or tower is provided having an arm mounted thereon which is capable of rotating or being rotated around the axis of said mast or tower, and having attachment gear for attaching or allowing the aeroplane to attach itself to the end of the arm, characterized by this that the said attachment gear is connected to cables or the like, in such manner that the said attachment may automatically pay out or extend to enable the radius of the curve on which the aeroplane is caused to move to be extended beyond that given by the length of the arm.

In this last embodiment of the invention the attachment gear for attaching the aeroplane may be connected to the arm by means extensible against a spring or other resistance.

The attachment gear for attaching the aeroplanes may be connected to the pivoted arm by means extensible against a spring or other resistance, which resistance may be adjusted so that it requires a pull in excess of that corresponding to the weight of the aeroplane to be handled, or any other desired pull, to be applied to cause the extensible means to extend.

The resistance of the spring or other resistance may be so arranged as to increase as the attachment gear pulls out or extends further and further, so that a limit is reached in each case depending on the weight of the aeroplane and its speed or the centrifugal force acting thereon. The resistance to extension of the said attachment gear may be regulatable according to the weight of the aeroplane to be handled or dispatched and to the centrifugal force which it is anticipated will have to be resisted.

The resistance may be so arranged that it may be adjusted only to allow the attachment gear to start pulling out when any particular desired tension is applied or when a tension exceeding the weight of the aeroplane to be handled is exceeded by some percentage or multiple, for example when the tension exceeds from ten per cent above to one and a half times to two times the weight of the aeroplane. This adjustment is particularly necessary when an aeroplane is to be dispatched as it is important that no extension of the attachment gear shall take place until the pivoted arm has risen a reasonable distance so that the aeroplane cannot possibly sink below the original level it started from when hanging from the pivoted arm in its lowered position.

The said attachment gear may be arranged to be capable of pulling out or extending when a pull is applied thereto nearly equal to or exceeding the weight of the aeroplane to be received or launched respectively by a certain ratio, the limit of extension of the attachment varying from a small amount to a length of from one half to three quarters of the length of the pivoted arm.

As above explained in dispatching an aeroplane the tension on the attachment gear must be so adjusted that it cannot extend until the aeroplane has swung out on the pivoted arm to clear obstacles in the space around the mast. In receiving an aeroplane the tension on the attachment gear may be reduced so that when the aeroplane hooks on the gear will at once extend. This not only reduces the shock but also causes the aeroplane to move on a transition curve joining the tangent or curve of large radius on which it is flying before it hooks on with the curve on which it is first caused to move when it has caused the rotating arm at the top of the mast to take up a speed of rotation approximating to the momentary speed of rotation of the aeroplane about the mast when in hooked on position. The aeroplane's speed of rotation is of course reduced by the pulling out of the attachment gear to its extended position. The amount by which the gear can extend will not usually be found, even with the heaviest aeroplane, to exceed one half or three quarters of the length of the pivoted arm because it is difficult to allow of a greater extension of the springs or weights inside the mast or tower. If however mechanism can be devised for multiplying the extension beyond these limits such mechanism may be utilized. As in landing the speed of rotation of the aeroplane around the mast drops off the tension in the attachment gear may be taken up if it originally was less than that equivalent to the weight of the aeroplane so that when the aeroplane finally comes to rest hanging from the end of the arm in its lowered position it shall be supported by the attachment gear. Owing to the fact that the aeroplane may circle around the mast attached to the pivoted arm several times before coming to rest there will be time for the operating staff in charge of the apparatus to wind up the tension on the gear to a desired amount after the hooking on of the aeroplane. After the aeroplane has come to rest it can be lowered to rest on its ordinary landing gear by slackening off the tension in these ropes to lower the aeroplane gently.

In this paying out device a multiple block tackle may be introduced between the springs used and the aeroplane attachment devices so that the aeroplane may pay out to an extent exceeding the extension of the springs under the pull applied to them by the aeroplane by a ratio depending on the tackle ratio.

To prevent the attachment gear from running out too far upon a very heavy aeroplane at high speed hooking on to the attachment stops may be provided, preferably fitted with spring buffer means, adapted to prevent the gear extending beyond a desired maximum limit.

The apparatus according to this invention may comprise cables or the like to the attachment gear, a spring or springs connected to said cables, a swivel to prevent the twisting of the cable or spring when the pivoted arm revolves, a stop on the cable at the attachment end thereof and winch or like means so arranged that a tension may be placed on the spring or springs, which tension may be adjusted by the winch to suit the weight of the aeroplane so that the said attachment will not pull out or extend further until or unless the said predetermined tension is exceeded.

In this apparatus the pivoted arm, instead of being inert and merely capable of rotation under the impulse given to it by the forces applied to it by the aeroplane, may be capable of rotation around or about the mast or tower, and means may be provided whereby the said arm may positively be made to rotate.

The pivoted arm may be adapted to be rotated by gearing or by a cable, rope or the like passing around the rotatable head carrying the arm, said cable or the like passing around jockey pulleys or the like and then to the drum of a winch, or other driving or rotating mechanism preferably driven by a suitable engine or motor, said mechanism being capable of rotating the pivoted arm at a desired speed.

The invention also includes apparatus as above described but in which the pivoted arm has a telescopic extensible part capable of increasing the length of the arm, the aeroplane attaching ring or loop being carried upon the outer end of said telescopic portion. This telescopic portion may be attached to the cables, or cables and springs, or other controlling means governing the pulling out or extension of the aeroplane attaching ring or loop.

The telescopic portion of the pivoted arm may be so controlled that it will only extend when a pull exceeding that equivalent to the weight of the aeroplane to be dealt with is exceeded, and the said portion when it has been caused to extend may be engaged by a ratchet or pawl or equivalent holding device to hold the said telescopic part in extended position.

The said holding device may be so arranged as only to come into action after the pivoted arm has risen above a certain desired angle —for example when the arm has risen to an angle of 65° to the axis of the mast, and further be so arranged that when the arm falls below the said angle the holding device, if such is holding the telescopic portion extended, will be tripped to allow the said portion to retract again.

As a further modification the pivoted arm may be provided with means whereby the telescopic portion, when said arm is in a raised position, may be caused, by the operation of mechanical means, to extend and to be held by the holding device in its extended position to enable the telescopic portion to be drawn out to its limit when prepared to receive an aeroplane about to be landed.

The invention also includes in its preferred embodiment apparatus for landing or launching an aeroplane comprising a high mast, a pivoted or hinged arm carried by the mast and capable of rotating or being rotated around the axis of the mast, said arm also being capable of tilting on the mast so that its outer end may rise and fall, an aeroplane engaging device on the end of said arm secured to a cable or other flexible means passing down the length of the arm, characterized by this that the said cable or the like has spring or elastic means attached or operating in connection therewith to restrain the extension and to cause the withdrawal of the aeroplane engaging means from or to the end of the said arm, the said spring or elastic restraining means being so arranged or adjusted, or capable of adjustment, that under the vertical weight of the aeroplane or under the combined resultant force due to the weight of the aeroplane and the small centrifugal force when the same is rotating at slow speed around the mast with the arm in a lowered or steeply inclined position the aeroplane engaging gear will be drawn up tight against the end of the inclined arm, but when the arm rises, or is in raised position, due to the increased centrifugal force thereon of an aeroplane attached thereto and whirling around, or being whirled or driven around, the mast at a high speed, the said cable or flexible means will allow the aeroplane engaging means automatically to pay out, thereby increase the radius of the path followed by the aeroplane whilst still restraining and controlling the aeroplane in said raised position.

In these various forms of apparatus the invention includes the combination therewith of an aeroplane engaging device comprising a widely extended loop of cable or other flexible means, which normally is kept extended or opened out by spring arms or equivalent means, and which is capable of lengthening under stress and closing when an aeroplane attaches thereto.

It also includes engaging gear on the aeroplane itself adapted to co-operate with the spring or elastic extension gear on a launching and landing apparatus, said gear on the aeroplane comprising a horn or equivalent adapted to enter the ring or loop on the landing mast, a hook or notch to securely engage said ring or loop when the aeroplane is attached, and a catch to prevent the aeroplane when engaged from accidentally breaking adrift.

This engaging gear on the aeroplane which is adapted to co-operate with the engaging gear on the landing mast may comprise hooking on or grappling means adapted to pull out or extend against spring resistance, and an indicator in combination therewith to show to the aeroplane's pilot the stress on said springs, and thereby to indicate when said stress, due to the weight of the machine and the centrifugal forces operating, in launching has sufficiently reduced to enable the aeroplane to be cast off with safety thereto.

The invention will now be described with reference to the accompanying drawings which show, merely by way of illustration and largely in a diagrammatic manner, certain forms the different parts of the apparatus may take. In these drawings:—

Figs. 6 and 7 show in some detail how the last two devices may be combined.

Figs. 8 and 9 show the attaching device on the end of the pivoted arm and the cable attachments.

Figure 10:
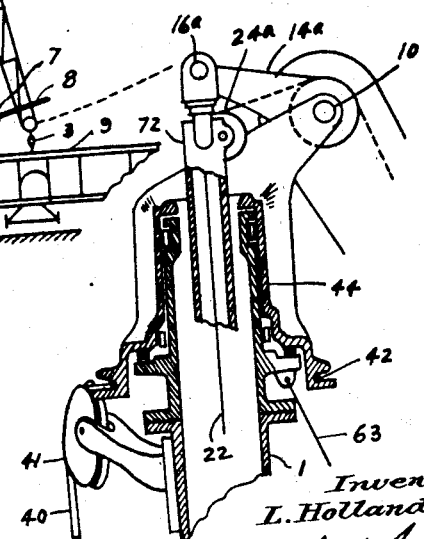

Fig. 10 indicates means whereby the pivoted arm may positively be made to rotate.

Figs. 11 and 12 show the attaching and detaching device on an aeroplane.

Fig. 13 shows a spring controlled connection in the device carried by the aeroplane and a scale to show the pull.

Figure 14:
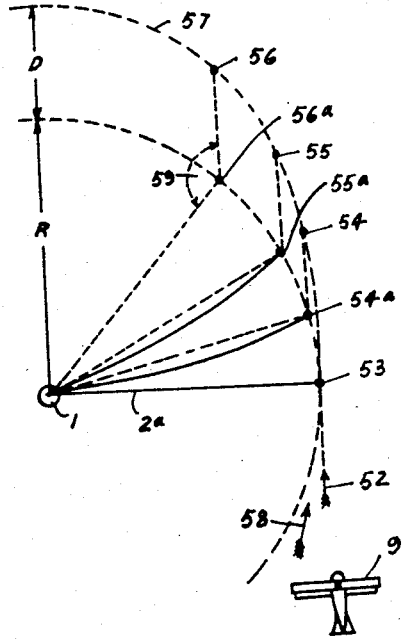

Fig. 14 is a diagram explaining certain considerations which reduce the shock upon the apparatus on the landing of an aeroplane.

Figure 15:
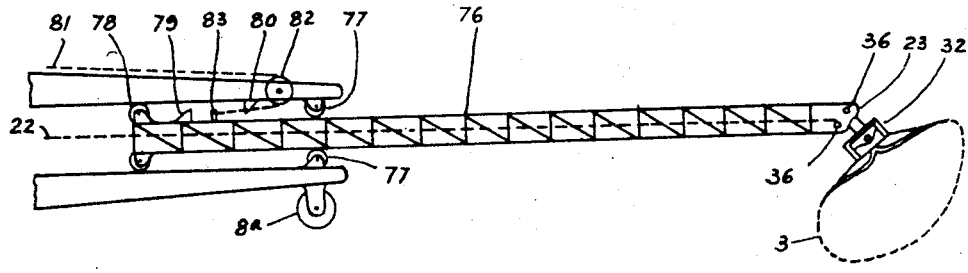

Fig. 15 shows a form which the telescopic means may take when applied to the pivoted arm.

Figure 16:
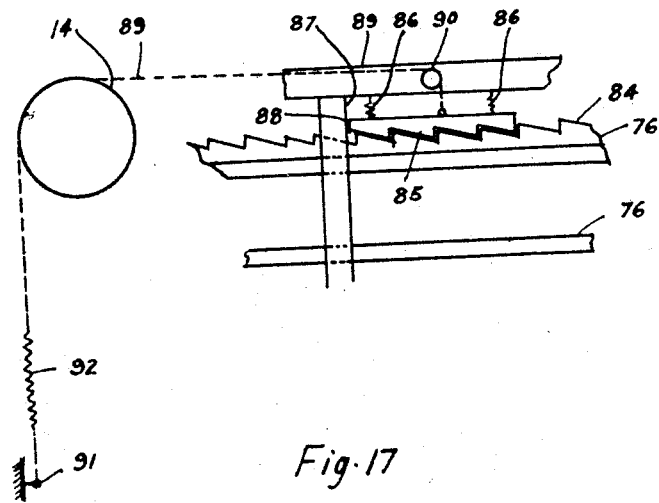
Figure 17:
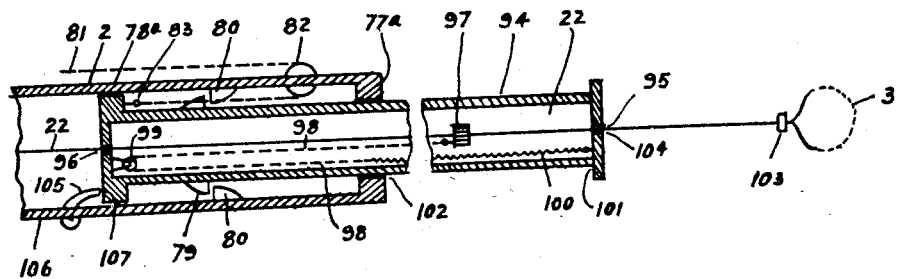

Fig. 16 shows gear for engaging the telescopic member to hold it in extended position when tension thereon is removed, and Fig. 17 is a diagram of cable attachments.

The invention consists of a device for launching aeroplanes into the air and for landing aeroplanes from the air.

It comprises essentially a mast (which is very strongly fixed either to the ground, to any building, to a ship or other structure stationary or moving of sufficient strength for the purpose) from the top of which projects a freely revolving and rising and falling arm 2. At the end of the arm further away from the mast is a ring, hoop or loop, or other attaching and releasing arrangement 3 the counter-part of which ring or other arrangement is mounted upon or built into the aeroplane or aeroplanes which it is intended shall be launched from or landed upon the arm and mast. The counterpart of the ring may on the aeroplane consist of any suitable shape of hook or grappling hook 4 having a projection or horn 5 which the pilot of the aeroplane by so steering the aeroplane is capable of causing to attach itself to the said ring or other arrangement 3; or, vice versa, the hook may be at the end of the arm and the ring on the aeroplane. This attaching arrangement is also arranged so that when ascending into the air the pilot of the aeroplane can by the movement of certain handles or other arrangement 6 cause the ring and hook to release themselves and separate.

According to the embodiment illustrated, near the base of the mast is mounted a circular track 7 so arranged and of such size and position that a wheel 8 mounted upon and revolving upon the arm 2 may run upon said track and thus prevent the arm 2 fouling or rubbing against the mast and also enabling the aeroplane when it is moving slowly to revolve round the mast near its base suspended from the top of the mast by means of the arm 2, the arm then resting against the track 7 being supported on the aforesaid wheel 8.

The arm is pivoted at 10 and may be counterbalanced, for example by a weight 11, in such a manner that (when no aeroplane is to be launched) it comes to rest projecting out more or less horizontally as at 2a—that is to say in a position suitable for enabling an arriving aeroplane to attach itself to the outer extremity of the arm.

The foregoing parts of this invention are described more fully hereinafter, but are sufficient to make the principle of this invention clear. The method of operation is as follows:—

To commence with the launching of an aeroplane into the air; the aeroplane is suspended from the hook 3 and the arm 2 is resting against the track 7 supported from the track on wheel 8; the propeller of the aeroplane is revolved in the ordinary way and causes the aeroplane to move forward, the wheel 8 running on the track 7, and the aeroplane following a circular path around the mast 1 still suspended from the freely revolving arm 2; as the speed increases the aeroplane 9 and arm 2 begin to leave the track still revolving round the mast because the centrifugal force of the aeroplane and arm going round cause them to swing out from the mast and to revolve round the mast at a greater radius, which radius will go on increasing as the speed increases; but the centrifugal force is not the only force tending to cause the areoplane and arm to swing outwards and upwards and to revolve at a greater radius, the pilot of the aeroplane soon has some air pressure on the aeroplane wings to make use of and he so uses this and steers the aeroplane that it also tends to raise the aeroplane and arm upwards and outwards and to revolve at a greater radius as the speed increases; there is also a third force which may or may not be used without effecting the principle of the invention, and that is the arm 2 by means of its counterbalance 11 or owing to a spring tension applied thereto is tending to assist in lifting the aeroplane and to take up the position 2a. It will thus be seen that as the speed (on its more or less circular path) of the aeroplane increases it will occupy a more and more outward and upward position until by means of its speed through the air it is supported upon its own planes; when this state of affairs is reached it is merely necessary for the aeroplane pilot to move the necessary handle 6 or levers, or operate such other arangement as may be in use, to cause the ring or loop 3 and hook 4 or other attaching arrangement which was holding the aeroplane to the arm to disengage themselves and then the aeroplane is completely separated from the arm and mast and proceeds on its journey.

The landing of the aeroplane is a reversal of the sequence of the events described in the launching and may be explained as follows. The arm of the mast by means of its counterbalance 11 or owing to the tension in lifting ropes to be described later when no aeroplane is attached to it, is arranged to take up a more or less horizontal position as at 2a; the ring 3 or other attaching arrangement is also ready to receive and be engaged by its counterpart 4 which is attached to or forms part of the aeroplane; the aeroplane which is to be landed approaches the end of the arm in a direction more or less at right angles to the arm and is steered in such a way as will cause the horn 5 and hook 4 on the aeroplane to catch on to the ring 3 on the arm 2, or as will cause the attaching arrangements of the aeroplane and the arm of whatever type they may be to engage in one another and lock securely together in such a way that they cannot be disengaged or unlocked unless the pilot of the aeroplane by the moving of certain handles, levers or other arrangements causes the aforesaid ring and hook or other attaching arrangements to disengage and separate; but at the time of landing this would not be done so that the aeroplane becomes attached or locked to the end of the arm at 2a and draws the arm with it; the aeroplane being hooked on cannot proceed any further in a straight direction because it is now attached to the end of the freely revolving arm and the momentum which the aeroplane possesses causes it to draw the arm with it and to take up a circular path and revolve round the mast. The arm may or may not be constructed so that it is more or less flexible in the direction which is more or less the direction of the path of the aeroplane at the time of its becoming attached thereto so as to minimize as much as possible the shock to the aeroplane and to the arm and mast at the time that the aeroplane becomes attached to the end of the arm; further the arm itself, and more particularly its outermost portions, is made as light as possible also so as to minimize the aforesaid shock. Now when landing an aeroplane the pilot slows up or stops the propeller, either before, or at the time of, or soon after the aeroplane has become attached to the arm; so that the weight of the aeroplane going round the mast at a decreasing speed gradually causes the aeroplane to revolve in a position lower and nearer to the mast, because the centrifugal force holding the aeroplane extended outwards is gradually becoming less and less and because the lift of the aeroplane on its own planes is also becoming less and less as the speed of translation drops until the wheel 8 on the arm rests against and revolves upon the track 7 at the base of the mast, and, finally, the propeller being stopped altogether, the aeroplane will come to rest hanging from the arm in the latter's lowermost position. It is more or less incumbent upon the pilot of the aeroplane to steer the aeroplane in a truly spiral and regular path around the mast in spite of the wind tending to cause the aeroplane to rise on one side when meeting the wind and fall on the other side when travelling with the wind. This the pilot does by moving his planes or vanes in the usual manner known to pilots.

Figure 1:
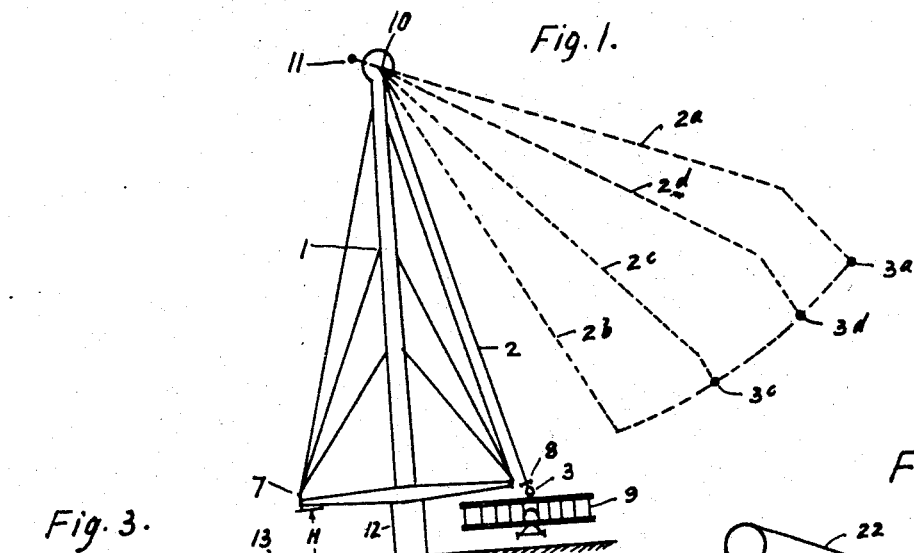
Fig. 1 is a diagram of the apparatus.

Referring now to Fig. 1 let us assume that the length of the mast or tower 1 from the level of the track 7 to the pivotal point of the arm 2 is 150′. Further let us assume that the radius of the track 7 is about 40′. Below the track 7 the diameter of the mast or tower must be reduced at 12 to be the least compatible with strength. The height H of this reduced portion must be ample to receive the largest aeroplane to be handled between the supports of the track 7 and the ground or surface below. Such clearance as are reasonable to allow of tilting of the wings must be provided. With a track 40′ in radius it is probable that aeroplanes having wing spans up to 70 feet or thereabouts could be accommodated.

With the dimensions indicated above an aeroplane would have to attain a speed of 12 or 13 miles per hour around the track 7 before it had any tendency to leave the track and swing outwards, owing to the centrifugal force thereon. The arm 2 would swing outwards to the position 2b making an angle of 30° with the vertical when a speed of 25 or 26 miles per hour is attained. These speeds neglect the influence due to the wind pressure on the wings of the aeroplane which at such a speed as 25 miles per hour would be beginning to have a very distinct influence. These speeds also neglect the counterbalance or pull on the arm which may cause it to rise further still.

As the speed of the aeroplane rises still further the arm 2 rises and the radius on which the aeroplane is moving also increases. When the arm is at 45° with the vertical, as indicated at 2c, the speed will be about 40 miles per hour neglecting the lift of the planes. Such a speed is one approaching that at which the aeroplane will have gathered speed enough to fly. The end of the arm 2 is then in position 2c moving on a radius of about 110'.

It will be obvious that shortly after the arm reaches an angle of 45° the plane will have acquired flying speed. This speed depends on the type of aeroplane and the load carried thereby.

When the arm reaches a position making an angle of 60° with the vertical, as indicated at 2d, the speed of rotation of the aeroplane will be about 60 miles per hour if it is still attached to the end of the arm. Most aeroplanes should have sufficient lift to fly before this speed is reached. The plane if secured to the end of the arm will be steeply inclined to the horizontal as it is being forced round in a circle the diameter of which is about 270°. The pull on the attachment and along the centre of the arm will be, neglecting the effect of the lift on the wings, about twice that of the weight of the aeroplane.

To reduce the heavy tilt on the aeroplane and also the rate of revolution of the arm—which under the conditions suggested above would vary from about 4½ revolutions per minute when the arm is at 30° to 6 revolutions per minute when the arm is at 60°, the attachment 3 according to this invention is so arranged that it is caused to pay out either automatically under an increasing resistance or under spring or similar resistance. Let us assume the attachment 3 is paid out so that it starts lengthening when the arm has reached an angle of 30° and has lengthened the arm by 75' when the arm reaches an angle of 60°.

The radius at which the aeroplane is moving when the arm is at 60° and the attachment has paid out to this extent is about 200' and the aeroplane would have to exceed a speed of 70 miles per hour on this radius to hold the arm out at this angle.

By paying out the attachment the radius on which the aeroplane is moving is at once increased and accordingly the centrifugal force exerted by the aeroplane on the attachment at the speed it is travelling at the moment is reduced. The result of paying out the attachment suddenly with the arm revolving at any particular angle would be that the length of cable connecting the end of the arm to the aeroplane would at first drop below the angle reached by the arm, the actual revolutions per minute of the arm would momentarily drop and the aeroplane would sink slightly till its speed further increased.

By paying out the attachment gradually under spring resistance or under the resistance of hydraulic or fluid compression brakes or under a system of weights the aeroplane would attain to a flying speed before the arm 2 had risen as high as it otherwise would have to rise and would also attain this speed with less centrifugal force on the connections and being on a larger radius it would not be tilted to the same extent when about to be cast off.

As will hereinafter be explained the arm 2 may be caused to rise by positive means such as by the action of a winch so that the arm might be used to lift the aeroplane higher than it would be lifted by its centrifugal force and hence the aeroplane hanging below the end of the arm in a paid off position be still well clear of the ground.

For example, as the aeroplane gathers speed and the attachment pays out the loop 3 when the arm is at 2c might be at 3c, when the arm is at 2d at 3d, and when the arm is at 2a be at 3a. The aeroplane would then swing out on the dotted curve 3, 3c, 3d, 3a and be in a very much better position as far as centrifugal force thereon and tilting therefrom than otherwise.

Figure 3:
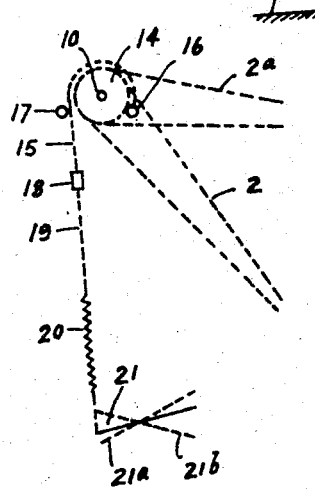
Fig. 3 shows diagrammatically gear for causing the pivoted arm to lift or drop positively.

Fig. 3 indicates a means whereby the arm 2 may be caused to rise or fall as desired. For example to enable a second aeroplane and any other aeroplane to be launched after one has been launched and has caused the arm to remain in the more or less horizontal position 2a. Now the counterbalancing of the arm may be carried out as follows:—

The inner end of the arm is pivoted upon a centre 10, about which centre the arm rises and falls as hereinbefore described. Upon the same centre 10 and built into and forming part of the arm may be a wheel or sector of a wheel 14. Around this wheel or sector passes a strong flexible rope or cable 15 the end of which is connected to the periphery of the wheel at 16. The rope or cable then passes down the middle or near the middle of the mast 1 being brought to the required position either by making the wheel of the requisite diameter or by the insertion of a jockey pulley 17, it then passes to and is fastened to a freely revolvable joint 18. This joint enables the upper part of the rope or cable 15 which has just been described to revolve freely with the arm 2 as this revolves round and round the mast 1 without twisting the lower portion of the rope or cable 19 (which is just about to be described) with it.

The lower portion of the rope or cable 19 then passes from the lower end of the revolvable joint to a spring or springs 20 and the strength of this spring or springs is so adjusted that the tension therein is normally sufficient to raise the arm until it occupies the more or less horizontal position. The lower extremity of this spring or springs is fastened to a spring tension adjusting lever 21 which may be provided with a catch which may be operated to cause the said lever to remain in either of two positions. This lever may be so arranged that when it is in one position (the lower one), indicated at 21, the arm 2 without any aeroplane on it would occupy the more or less horizontal position 2a and with an aeroplane on it would then occupy the lowermost position, the weight of the aeroplane having caused the counterbalancing spring or springs to be stretched sufficiently to allow the arm to descend to this position resting against the circular track 7 around the mast. It will thus be seen that when the spring tension adjusting lever is in its lower position 21a, and an aeroplane has just been launched the arm is in its upper more or less horizontal position 2a. Now when it is desired to dispatch from the base of the mast a second or subsequent aeroplanes, preparatory to launching the arm is required to be lowered. Therefore the spring tension adjusting lever is so arranged that it may be moved to its upper position 21b to allow of sufficient slackness to be given to the spring, rope or cable 20, 19, 15 that the weight of the arm will cause it to descend to its lower position 2; and then the ring or other attaching device 3 at the end of the arm may be attached to its counterpart on the next aeroplane which it is desired to launch; then when the next aeroplane has been attached the spring tension adjusting lever is moved to its lower position 21a and thus imparts an outward and upward pull to the arm so that it is trying to raise the aeroplane and occupy the more or less horizontal position 2a so that the next aeroplane can then be launched as hereinbefore described. In a similar manner any number of aeroplanes may be launched.

If it is desired to land a second aeroplane or subsequent aeroplanes the operation is effected as follows:—The first one which has been landed is hanging on the end 3 of the arm. The spring tension adjusting lever is then moved to its upper position 21b which reduces the outward and upward pull in the arm. Some support under the aeroplane or under the aeroplane's wheels is then moved or pushed into position so that the aeroplane is raised sufficiently to remove its weight from the ring or hook or other attaching device upon which it is hanging at the end of the arm to enable the said ring or hook or other attaching device to be detached and completely separated, and which thus enables the aeroplane to be wheeled or moved away from the mast altogether. But as an alternative, provision may be made for lowering the aeroplane from the end of the arm by the operation of levers or by paying off the cable holding the attachment 3 so that it rests on its own wheels or otherwise upon the ground or other support and may similarly be moved or wheeled away from the mast altogether. The spring tension adjusting lever is then gradually moved to its lower position 21a, and in moving it the arm is thereby raised to the raised position 2a. If so desired the spring tension adjusting lever or its equivalent may be arranged with gearing so that by rocking it to and fro or by providing it with suitable gear ratios it will be within the strength of one man to raise the arm to raised position. The auxiliary wheel or sector may be replaced by two or more wheels or sectors in which case two or more ropes or flexible cables would be provided from the anchoring positions on the wheels or sectors to the revolving joint. Similarly two or more ropes or flexible cables may be provided between the revolving joint and the spring adjusting lever or equivalent. The object to be obtained by having more than one rope or flexible cable may be either that of enabling the revolving joint to be constructed with an opening right through its centre to allow of the passage through it of other ropes or cables hereinafter described, or that of getting greater flexibility, or that of getting a greater margin of safety.

Figure 4:
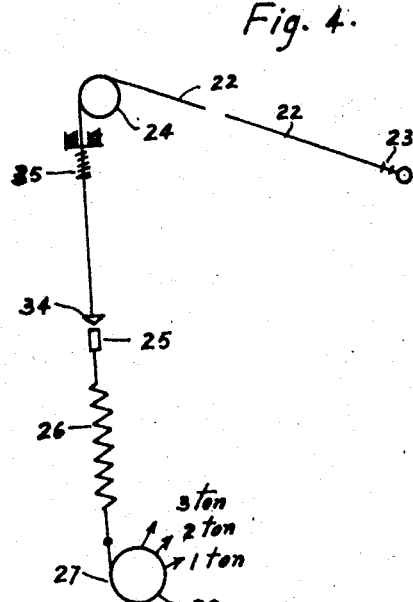
Fig. 4 is a diagram illustrating the paying out gear for allowing the attachment device for the aeroplane to extend.

One manner of carrying out the main objects of this invention is illustrated diagrammaticaly in Fig. 4 and has either or both of the following objects in view—firstly that of minimizing or reducing the shock to the arm and to the aeroplane at the time that the aeroplane to be landed becomes attached to the end of the arm, and secondly that of increasing the radius at which the aeroplane revolves around the mast at either or both of the following times, firstly, immediately following that at which it has just become attached to the arm, or, secondly previously to the moment at which it becomes detached from the arm; for at either or both of these times the impact on the arm and on the aeroplane and the discomfort felt by the occupants of the aeroplane owing to the effects of the centrifugal force due to the circular motion of the aeroplane around the mast are likely to be at a maximum and to vary inversely as the radius of the curve on which the plane is forced to move. This device is such that it enables the ring or hook 3 or other attaching device at the end of the arm 2, when a pull is exerted upon it by an aeroplane attached thereto, which pull is greater in force than the dead weight of the aeroplane, to be drawn out further and extended outwards away from the normal position at the end of the arm which it occupies when the aeroplane is either hanging stationary from the arm or is only revolving slowly around the mast. This capability of the ring or hook or other attaching device of being drawn out in the above circumstances is attained by having the aforesaid ring or connecting device fastened to the end of a sliding rod or tube or to a flexible cable or rope, or a combination of these things, the other end of which is attached to a spring of such strength and so arranged that it can only be stretched out or lengthened when a pull is exerted exceeding the dead weight of the aeroplane. The other or fixed end of the spring is attached to a strong anchorage either within the arm itself or within the mast, and in cases where the fixed end is attached to an anchorage within the mast then a revolving joint is interposed at any convenient point between the place where the sliding rod or tube or flexible cable or rope has its direction of force changed at the top of the mast and the position of the anchorage.

In Fig. 4 the attachment device 3 is connected to the cable 22 preferably in such a manner that the base of the said attachment may be pulled up tight against a stop or seating 23 in the end of the arm 2. The cable passes down the arm 2 and around a pulley 24. It then passes down the mast or tower being provided with a swivel or equivalent 25. Very powerful springs 26 may be attached to the cable and the end of the cable 27 passes around the drum of a winch 28. If springs 26 are introduced into the cable the strength of these springs should be such that they will be capable of resisting after suitable extension the maximum pull due to the heaviest aeroplane to be handled plus the centrifugal force. It will readily be understood that the centrifugal force when the arm rises to above an angle of 60° to the vertical may approach to or be double the weight of the aeroplane. The spring or springs 26 must be capable of resisting this with a suitable margin of safety.

Figure 5:
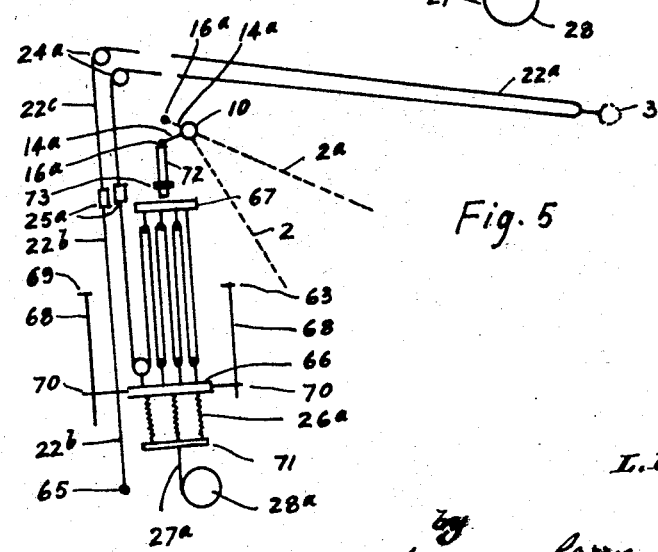
Fig. 5 is a diagram showing the attachment of multiple part blocks and tackle between the springs of the paying out device and the aeroplane attachment ring. It also shows how the tension on the cable for supporting the arm increases as the arm sinks lower and lower.

Further, these springs 26 should be capable of a considerable amount of extension. As indicated in Fig. 4 the spring could scarcely extend or contract to an amount exceeding say 35% of the length of the arm 2, but it may be possible to provide some multiplying arrangement whereby the attachment 3 may be paid out to a greater extent than this. Such a multiplying arrangement is shown in Figs. 5, 6 and 7.

If a spring is introduced capable of extending to a length equivalent to 90% of the height of the mast 1 when the maximum stress is thrown on the connections in landing an extra heavy aeroplane at high speed it is preferable that such a spring should be placed under an initial tension before the aeroplane is hooked on, which initial tension should be about equivalent to the weight of the plane so that the aeroplane by the time the arm 2 comes to rest in its lowered position will be held up to the end of the arm by the initial tension in the connections. The cable 27 may therefore be connected to a winch 28, which winch might conveniently have certain indications such as 1 ton, 2 tons, 3 tons—to indicate the initial tension in the spring with the drum in the said positions.

A single device suitable for giving a spring extension of say 35% of the length of the arm when landing a very large aeroplane would give but little extension—perhaps only a 5% extension when landing a very light plane. A light plane would accordingly be subjected to higher relative impact in stress than a heavy one under the lesser extension, and it may be found advisable to duplicate or triplicate the devices shown in Fig. 4 and to design separate springs to handle respectively light, medium and heavy planes.

It is not absolutely essential to have a spring or springs 26 fitted as it would be quite possible by using a cable which could be paid out, say under the brake or friction control of a winch drum, or under control of hydraulic or like braking gear, to reduce the shock in landing an aeroplane and reduce the stresses and the tilting of the machine in assisting planes to take off. In such cases the plane when hooked on when landing would pull out the cable under heavy brake resistance and the said cable would be wound in again so as to pull the aeroplane hard up against stop 23 before the arm came to rest in its lower position. When an aeroplane was to be assisted in getting off the cable would be let out gradually as found requisite.

With a paying off gear it will be evident that facility in attaching or detaching of an aeroplane to or from the arm when in lowered position would be greatly increased, as all that would be needed would be to use the winch 28 to pay off the rope 22 to lower the aeroplanes gently to earth, or conversely to slack off the attachment ring 3 until it would be hooked on to the aeroplane on the ground or surface 13 below and then to lift the aeroplane up against the stops 23 on the arm by tightening the rope 22 as requisite.

The rope 22 may have a device 34 clamped thereto which may take up against a buffer stop 25 when the rope has pulled out to the limits which it is desired should not be exceeded.

Referring now to Fig. 5 the one end of the two part cable 22a which passes to, and is attached to, the aeroplane attaching ring 3 passes round the jockey pulley 24a and to the swivel or like joint 25a and thence to the anchorage 65. The other part 22c of this cable after passing over a jockey pulley and through the revolving joint 25a passes to the multiple blocks 66, 67. This system of blocks is shown in the figure as having eight parts. The attachment ring 3 therefore would have an extension of four times the extension of the spring 26a.

The lower part 66 of the set of blocks is attached to the springs 26a and has guide members adapted to slide up and down the slide bars 68, 68, as far as the stops 69. The springs 27a are connected to the cross bar 71 and this is connected by the cable 27a to a winch drum 28a. Any desired tension within certain understood limits may be placed on the springs by working or paying out the winch 28a.

The upper set of blocks 67 is attached to a member 72 which has a rotatable joint 73 therein. The upper end of 72 is connected at 16a to a crank arm 14a fixed to the pivot 10 of the arm 2.

It will be realized that assuming the difference in level of the end 16a of the crank 14a between positions 2 and 2a of the arm is say 4' 0" and the spring when extended by 4' 0" requires an extra tension of 1 ton on the ring 3 to so extend it, then as the arm drops from 2a to 2 block 67 rises 4' 0" and the block 66 rises a little over 3' 0" and the initial pull on the ring 3 is increased automatically to an amount of about three quarters of a ton. By these means the initial tension on the ring 3 with the arm in raised position may be increased, by say ¾ of a ton, on the arm falling, with the result that it may be so arranged that it will certainly raise the pull on the attachment to be above that due to the pull caused by the weight of the aeroplane itself when the arm is in said lowered position.

Referring further to Fig. 5 it will be seen that any desired tension may be placed on the ring 3 with the arm raised. This adjustment will be effected by the winch 28a. Upon an aeroplane attaching to the end of the arm a sudden pull is applied to the attachment 3. Assuming for the moment that this pull reaches a maximum value of say three tons on the ring 3 and that a pull of three tons is equivalent to a lengthening of the springs 26a by a distance of twelve feet; then owing to the multiplication given by the blocks and tackle arrangement 66—67 the ring moves outward by approximately 48 feet thus reducing the shock of the connecting operation.

As the speed of the aeroplane attached to the arm around the mast falls off, this pull drops drawing the ring 3 in towards its stop 23 on the end of the arm. As however the arm falls the other factor comes into operation increasing the pull on the ring 3 as the arm falls lower and lower. The numerical values of the tensions will of course be varied to suit the size and weight of the planes to be handled and will depend on the details of construction.

Figs. 8 and 9 illustrated one possible embodiment of the attachment for the aeroplane to hook onto, and shows also the end of the paying out gear.

In these figures 3 is a ring or hoop or loop or wire kept open by light spring arms of adequate strength to take the pull. This ring or loop 3 has a hook or tang 29 having a T end 30. The said T head drops due to gravity into a recess 31 in the yoke 32. The wire ropes (of which two are shown) 22 are attached to the yoke and the back 33 of the yoke may be shaped to be capable of taking a comfortable seating on the stop 23 on the end of the arm 2. The ropes 22 pass around pulleys 36, 36 and are held in position thereon by guide rollers 37, 37. An equalizing device 38 to equalize the pull on the ropes may be fitted.

The direction of the T head 30 and its shape forces the ring loop to take up a position with its plane perpendicular to the direction from which the aeroplane is expected to come— which direction is perpendicular to the arm 2.

In Fig. 10 means for causing the arm 2 to rotate around the mast is shown.

In this the endless ropes 40 which are passed around the drum of a suitable winch, rotating mechanism or the like 43 pass up to the top of the mast and around a pair of jockey pulleys 41 and thence around the large rope pulley 42.

This rope pulley is fixed to the revolving head 44 which carries the pivot 10 on which the arm rises and falls. By working the winch 43 the arm 2 may be made to revolve about the mast 1 whether an aeroplane is attached or not.

A free-wheeling or disengaging arrangement (not shown) must be provided enabling the revolving head 44 to rotate freely without check from the winch or driving mechanism 43 when an aeroplane suddenly hooks onto the arm.

The causing of the arm to rotate about the mast by means of gearing or other mechanism may be of great assistance, since the extra assistance so given to an aeroplane as it is trying to take off may be of very great importance to it as assisting to overcome the frictional resistance in moving on a curve. The positive driving of the arm shortly before the aeroplane has gathered flying speed and the paying out of the attachments so as to both assist the aeroplane to gather speed on its curved path and to increase the radius of the path on which the plane is flying and to thus reduce its tilt at the moment of casting off, may indeed be found almost essential.

Further, with mechanism to positively cause the arm to rotate it may or may not be found possible for an aeroplane to hook onto an arm when landing which arm is already rotating. If this can be done the shock to the arm and the apparatus may be considerably reduced and the stresses and strains in the parts be thus reduced both in the mast and arm and also in the aeroplane itself. In order to hook onto a rotating arm it would probably be necessary for the pilot to approach the mast on a curve or spiral.

In Figs. 11 and 12 a device is shown which could be fitted to an aeroplane to make it possible for it to be launched or received with apparatus as hereinbefore described. Assuming that a ring loop 3 is attached to or carried by the end of the arm 2, then a hook 4 having a projecting horn 5 is mounted on the aeroplane.

In Fig. 11 the apparatus is shown in its normal position—that is the position in which it would be when the aeroplane is about to attach to the ring 3 or when it is so attached.

The point 45 of the horn is above and in advance of the pilot so that he can see clearly how to steer the plane to cause the point of the horn to enter the ring or hoop 3. The horn runs through the said ring loop 3 and causes the hook part 4 to engage the ring. A spring pawl 46 or catch prevents the parts from disengaging. When hooked on, the ring takes onto the concave bend 47 at the top of the hook and the strain is taken with the ring loop 3 in the position shown in dotted lines. The hook is strongly stayed to the aeroplane body, as the stress thereon may exceed that due to the weight of the plane itself by two or more times depending upon the length of the arm 2 and the radius of the curve in which the aeroplane is caused to travel, and also upon the impact or relative suddenness with which the plane hooks on. A shaft 48 operated by the handle 49 in the cockpit of the aeroplane permits the hook to be rotated from its normal position with the point 45 of the horn pointing forward to the reverse position when it is desired to cause the aeroplane to detach itself from the ring 3.

In Fig. 12 the hook is shown when in a position to detach from the ring. The horn 5 points backwards owing to the turning of the shaft 48 and handle 49. The disengaging member 50 which is fixed to the aeroplane structure, has, as the shaft 48 and hook 4 turns, engaged and pressed down the pawl 46 so that it no longer closes the throat 51 of the hook. When the pilot judges that he has sufficient flying speed he guides his aeroplane so that flying on the proper curve it also lifts so that the part 47 of the hook instead of engaging the ring or loop 3 lifts clear thereof and the plane disengages from the ring and flies clear. It will be observed that this cannot be done until a reasonable flying speed has been attained otherwise the part 47 of the hook cannot be caused to lift clear.

The ring on the arm 2 should be so arranged that it will tend always to take up a position under its own weight which will make it hang in its yoke with its plane properly placed to receive the hook of an aeroplane to be hooked on. The formation of the T-shaped tang 30 of the hook might be such that it would, provided the pull on the ring 3 is not too much, allow the ring to rise slightly and to twist through 180° C. The reduction of stress on the hook and ring might be the criterion by which the pilot would judge whether he could cast off. Obviously he must not cast off until he has flying speed, when he judges he has this speed he by guiding his aeroplane upwards and inwards will be able to judge by testing whether he can turn the handle 49 whether the stress on the attachment is still excessive or not. When he can turn the handle he has momentarily attained the desired speed and is flying on the proper curve. Shortly afterwards he may steer the plane more steeply upwards and inwards and cast off.

The attachment shown in Figs. 11 and 12 might be modified so that when landing the horn 5 pointed forward all the time, and when an aeroplane was to be launched it pointed back all the time. In the latter case the release of the spring catch 50 would preferably be operable by means independent of the handle 49 so that the catch was only released after the pilot thought he had attained flying speed.

Fig. 13 shows a modification of the attaching arrangements carried by the aeroplane, wherein a spring 74 placed in the barrel 74a reduces the shock of the sudden pull on hooking onto the ring loop 3. The scale 75 may show the pilot in the cockpit the strain in the rod 48, when, in the operation of launching, the said scale indicates little or no stress, the pilot will know that he is largely supported by the air pressure on his wings and that he may prepare for casting off.

As an alternative, (not illustrated) the hook 4 may transfer the pull through suitable rods or cables to the axle of the landing wheels of the aeroplane and by these means the springs of such landing gear be utilized to reduce the shock to the aeroplane itself.

Fig. 14 illustrates diagrammatically the reception or landing of an aeroplane when a paying out attachment gear is used.

Suppose the aeroplane 9 is flying in the direction of arrow 52 and hooks onto the arm 2a at 53. This arm previously will have been raised to near the horizontal position so as to give as much clearance above ground as possible.

On hooking on at 53 the attachment starts pulling out either under spring, frictional or brake control. By the time the end of the arm 2a has got to point 54a the aeroplane is at point 54. When the end of the arm is at 55a the aeroplane is at 55. By the time the arm is at 56a the aeroplane is at 56.

We will assume that the spring resistance or the frictional or other resistance will only allow the attachments to pay out under the weight, speed and centrifugal forces developed, by a distance D. The radius of the curve to which the aeroplane is forced to fly within a time limit of say two seconds after attaching on is D+R. But it has had this time within which to change its course. The curve traced by the plane is 53, 54, 55, 56, 57 and this is a transition curve—that is one whose radius decreases accordingly to some law from infinity, if the aeroplane is originally moving straight on the tangent—to a radius which may fall to the radius R but will finally become D+R.

It will be noted that the various positions 54a, 55a, 56a, of the end of the arm lie behind the positions 54, 55, 56 of the aeroplane at the same instant owing to the inertia of the arm. There will therefore be a distinct bend where the attachments join the arm. The angle 59 between the line of action of the attachments and the direction of the arm tends to increase as the arm gathers speed.

Shock on the attachments may be reduced by making the arm rather whippy horizontally. This may be effected by making knuckle joints in the arm controlled by springs so that if necessary the arm under lateral stress will deflect or bow considerably. In Fig. 14 the bending of the arm is clearly indicated, and it will be clear that a certain amount of give is desirable.

Upon hooking onto the arm a considerable stress and strain is thrown on the apparatus and on the aeroplane. The transition curve 53, 54, 55, 56 joining the tangent 57 which is desired to force the aeroplane to follow much reduces shock and stress.

The pilot by approaching on a curve as indicated by arrow 58 can also help to reduce the shock. Also it is of course necessary for the pilot to bank rapidly at the moment of, or preferably just before, attaching.

Figure 2:
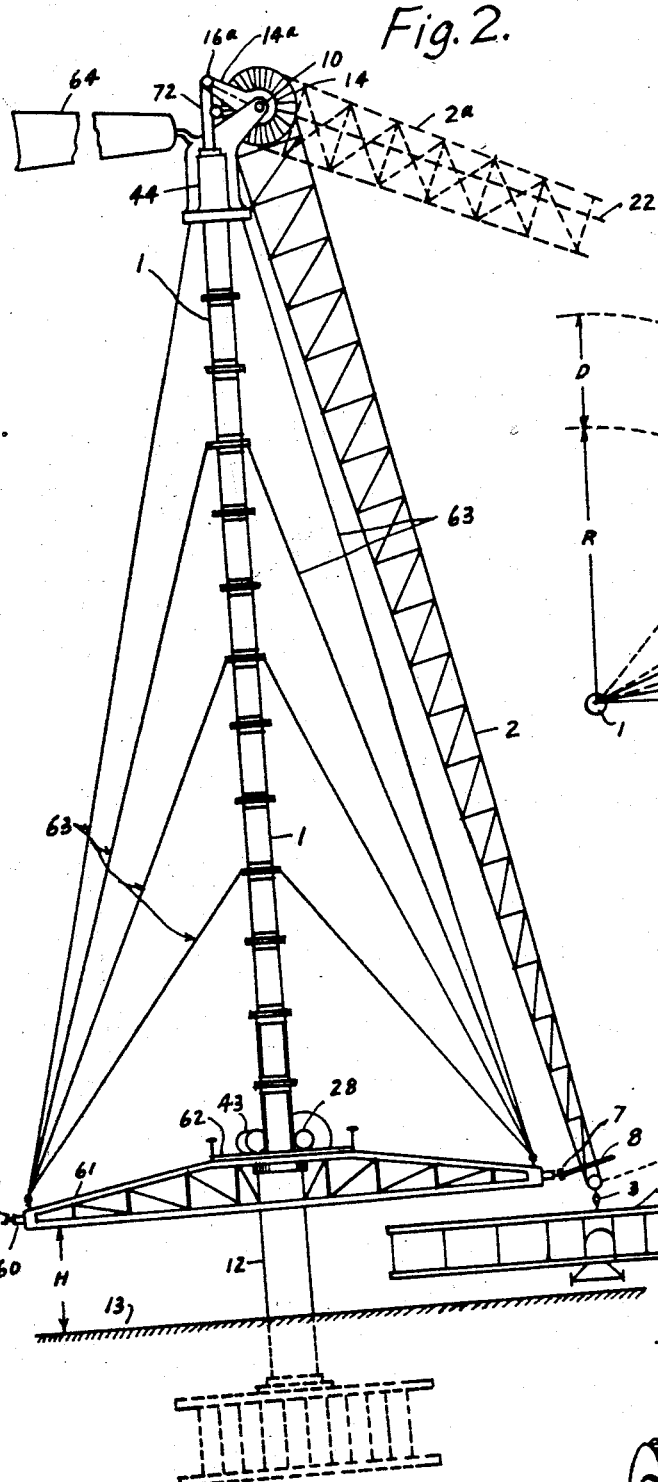
Fig. 2 is an elevation of a tower and pivoted arm giving greater details and certain indications of constructional details.

Returning now to Fig. 2 which shows, still somewhat diagrammatically, a constructional form.

The mast 1 has a revolving head 44 carrying the pivoted arm 2. Around the base of the mast the circular track 7 is built. If desired the track may be supported through the medium of springs 60 on a braced structure 61.

The wheel 8 on the arm runs on this track. This wheel, or any equivalent skidding or rolling device, might be mounted on springs or be fitted with pneumatic tyres to reduce the shock.

Ample space is needed below the track 7 for side projections of an aeroplane wing thereunder. The central column 12 must accordingly be of small dimensions but of great strength as it cannot be stayed and yet must be capable of resisting the bending moment due to the forces applied to the top of the mast through the arm 2. For a mast 100 feet high a steel tube 4' 6" or a little more in diameter built of thick steel plates, or of cast steel braced with tie rods, might be suitably strongly anchored to the ground. For a 150' mast it may be necessary to increase the diameter to 6' 0" or more.

A working platform 62 on which the various winches and mechanism is mounted may be provided above the track.

The mast above the track 7 may be guyed to the braced structure 61 supporting the said track by suitable guys 63, 63 thus reducing the size and weight of the mast 1.

The mast 1 may be built up of steel plates or be of any suitable construction. If made of steel plates the ropes 15, 22, etc. might be inside the mast.

At the top of the mast the arm 2 or revolving head 44 might be provided with a vane 64.

The ring or loop 3 although spread out wide to receive an aeroplane will, directly an aeroplane has attached on, pull out into an elongated loop. To prevent the wire, which form the stress resisting portion of the loop, from being bent to too sharp a curve, the part 47 of the hook on the aeroplane and the surface of the horn 5 leading thereto may be widened out laterally and given easy curves.

The wire rope forming the loop must naturally be very flexible. If desired a flexible wire rope may be anchored to the part 29 and after passing round the loop 3 and through an eye on the part 29 a suitable number of times, say 6 or 8 times, the further end be also anchored to the said part 29. Various loops on the rope may be suitably lashed or bound together to make a single rope of great strength and flexibility.

Referring now to Fig. 15 a diagrammatic view of telescopic means whereby the length of the pivoted arm 2a may be increased is shown.

In this figure the pivoted arm 2 is indicated as being made hollow, for example a hollow open frame providing suitable guideways or slideways inside so that a telescopic part 76 may be inserted therein and adapted to slide in and out within certain fixed limits. These movements will be under suitable spring control.

The end of the arm 2 may be provided with small brackets on which antifrictional rollers 77, 77 are mounted. The telescopic part 76 may also be provided with brackets on which the rollers 78, 78 are mounted. These assist in the easy in and out sliding movement of the part 76. If preferred suitable slippers or sliding surfaces may be substituted for the rollers 77, 78.

This part 76 has an end having a stop 23 against which the loop 3, or the yoke 32 of the aeroplane attachment loop 3, may be pulled up tight. The ropes or cables 22 securing the loop part 3 to the mast may pass centrally down the telescopic part 76 and be attached thereto in any convenient manner. The loop 3 may be attached rigidly to the end of 76 or through the medium of the yoke part 32 so that in addition to the telescopic part 76 pulling out when a suitable tension is applied thereto the aeroplane attachment may pull out further still.

To prevent the part 76 from pulling out too far a stop 79 may be fitted thereto to engage a corresponding stop 80 on the arm part 2.

The extending outwards of the telescopic part 76 should be capable of being operated by those in charge of the mast. For this purpose a rope 81 may be provided passing down the arm, around a pulley 82 mounted thereon, and be secured to the eye 83 on the part 76. By pulling on this rope 81 the part 76 may be made to protrude by any desired amount up to its limiting extension against the action of the spring constraint applied thereto by cables such as 22.

To hold the part 76 in its protruded position a pawl or like device may be used. Fig. 16 shows diagrammatically a holding device which comprises a rack 84 secured to the part 76 and a short rack bar 85 adapted to engage the said rack to prevent the return of the telescopic part 76 when it has been moved in the direction shown by the arrow 93. This rack bar 85 is kept in engagement with the rack 84 by the springs 86, 86 and the backward thrust on the rack bar is taken by the abutment 87 fixed to the arm 2.

To release the engagement the rope 89 is provided which passes around the pulley 90. This rope 89 may be attached to the stop 91 on the mast 1 and pass around the wheel or sector 14 or the pivotal point of the arm 2. The slack in the rope 89 may be so proportioned that the rack bar 85 is in engagement with the rack 84 when the pivoted arm is in its raised position but when said arm sinks below a certain angle—(say an angle of 65° with the horizontal) the rope is tightened to draw the rack bar 85 out of engagement. As a slack rope 89 is undesirable some spring device 92 may be provided to automatically take up the slack. The rope 89 although secured to the stop 91 might be operated by hand at any time to release the holding device 84—85.

By working the rope 81 the telescopic part 76 of the arm, when the same is in raised position, might be caused to protrude to its full extent to be held in protruded position by the holding device 84—85 so that the radius of the arm 2 might be considerably increased in order to receive an aeroplane. The landing aeroplane would thus only need to fly on a considerably larger radius than before and the centrifugal force would accordingly be reduced.

Upon the attachment of an aeroplane as its speed reduced and the arm 2 gradually lowered the point would be reached at which the holding device 84—85 of the telescopic part 70 released. This release would take place whilst the centrifugal force on the attachments was still fairly high so that the telescopic part 76 would not fly back at too excessive a speed. It would have retracted home long before the aeroplane came to rest with the arm 2 in its lowered position.

In launching an aeroplane the telescopic portion 76 would be arranged to pull out gradually as the arm 2 rose higher and higher. This might be due to the increase in the centrifugal force on the attachments as the aeroplane gathered speed and the arm rose. It might however be assisted by operating the cable 81.

Finally, when the arm reached its fully raised or limiting position and the aeroplane attained flying speed it would thus be moving on a curve of larger radius. As in such position the telescopic part 76 is held against the action of the springs controlling it in its outward extended position by the catch 84—85 the actual tension in the aeroplane attachment may reduce to zero and the aeroplane will thus have little if any trouble in casting off by simply banking a little more steeply and directing its course upwards at the same time.

In Fig. 15 the large landing wheel 8 which might be suitable for a pivoted arm of small dimensions is replaced by the smaller landing wheel 8a adapted to engage the track 7.

The arm 2 and its telescopic part 76 might be made in the form of light tubes. These two parts 2 and 76 might both be made flexible in the horizontal direction so as to reduce the shock in landing.

A modification of the telescopic part is shown in Fig. 17. In this the arm 2 is shown as of cylindrical tubular form with a tubular telescopic part 94 slidable therein.

This part 94 has apertures or central holes 95—96 for the passage therethrough of the cable 22.

The part 2 is provided with guide surfaces 77a and the part 94 with surfaces 78a so that the parts slide easily. Stops 79 and 80 prevent excessive movement.

The cable 22 has a stop 97 fixed thereto which may normally be inside and intermediate of the length of the part 94 but usually will be towards the outer end of the part 94.

To this stop 97 the light rope 98 is fixed which passes round pulley 99 and is connected to the end 104 having an extensible spring 100 connected to the rope.

Normally the part 94 is retracted with its flange 101 against the end 102 of the arm 2. At the same time the stop 103 on the rope 22 normally is against the end 104 of the part 94.

Upon a tension being applied to the loop 3 the stop 103 leaves the end 104 as the rope 22 is pulled out. After a short movement of the loop 3 the tension in the spring 100 caused by the movement of the stop 97 causes the part 94 to start moving also. It will readily be seen that in the limit the stop 97 brings up against the end 104 of the telescopic part with the loop pulled out, say 10 feet, further than the end 104, and the part 94 comes to rest with its stops 79 and 80 in engagement, being in said extended position possibly protruded by say 30 feet.

In this Fig. 17 a modified form of device for engaging the telescopic part 94 is shown in which the pawl 105 engages the inner end 107 of the part 94. This pawl may be disengaged by the pulling of the rope 106 in a manner already indicated.

It will be of course understood that the invention is not restricted to the embodiment described and illustrated.

For example the details might be much modified, within the scope of the invention.

Instead of springs for controlling the paying out gear it might be possible to substitute a system of weights or hydraulic or like cylinders, so that as the ropes paid out the tension would progressively increase.

The gear might be duplicate to suit the size or weight of the various aeroplanes to be handled.

It has been proposed for the purpose of dispatching and landing aeroplanes to use a fixed tower or mast with fixed cross arms at its top and to provide sheaves and cables so that an aeroplane may be hooked onto the end of a cable hanking from the end of one of the cross arms, and may be caused to swing backwards and forwards like a swing until sufficient velocity is attained at the bottom of the swing for the aeroplane to be unhooked and take off. With such means it has been proposed to use a moveable piston element connected to the cable, said piston working in a cylinder so arranged that upon an aeroplane hooking onto the cable when passing at speed the piston may compress a fluid in said cylinder to yieldingly resist the landing forces. By such means upon an aeroplane attempting to land the cable pays out to an extent permitted by the movement of the piston. Owing however to the stroke of the piston being strictly limited the paying out of the cable cannot be large and the aeroplane must be brought to rest or checked in a single oscillation or swing.

In launching an aeroplane using this known device no extension or letting out of the cable is possible, as the extreme length is limited by the height of the mast and the clearance above ground needed for the plane.

In the present invention the addition of extension gear in connection with a swinging device for aeroplane is not claimed but the spring or like extensions are applied to gear having a mast and a rotatable arm thereon which is thus capable of whirling an aeroplane in contra-distinction to merely swinging it, and it is to be clearly understood that the devices claimed herein are restricted in their application to use with aeroplane landing and launching gear in which a rotating or rotatable arm is an essential feature and in which the aeroplane is caused to travel in a circular or spiral path.

Having now particularly described and ascertained the nature of my said invention and in what manner the same is to be performed, I declare that what I claim is:—

1. Apparatus for landing or dispatching an aeroplane in a restricted space, comprising a mast, an arm rotatable about said mast, aeroplane-engaging means carried by said arm, the said arm and attaching means being adapted to extend outwardly upon the application of centrifugal stress thereto, and means tending to counteract the effect of said centrifugal stress, whereby the arm may be extended outwardly when launching or receiving an aeroplane and may then be brought closely adjacent the mast.

2. Apparatus for dispatching or landing aeroplanes, comprising a mast, an arm on said mast, the said arm carrying an aeroplane-engaging device, means for rotating the arm about the said mast, and a spring biased flexible means attaching the engaging device to the end of the arm.

3. Apparatus for dispatching or landing aeroplanes, comprising a mast, an arm rotatable about said mast, an aeroplane-engaging device on the said arm, and spring biased means attaching the engaging-device to the arm and resisting the outward movement of the arm in proportion to the outward movement.

4. Apparatus for dispatching or landing an aeroplane, comprising a mast, an arm mounted thereon and rotatable thereabout, attaching gear on the end of the said arm for attachment to an aeroplane, an elastic means connected to the attachment gear and adapted to extend outwardly as an incident to increase in the centrifugal force of the aeroplane in order to increase the radius of the aeroplane about the mast.

5. Apparatus for dispatching or landing an aeroplane according to claim 4, comprising spring biased means connecting the attachment gear to the said arm.

6. Apparatus for dispatching or landing an aeroplane according to claim 4, comprising spring biased means for connecting the attachment gear to the said arm, the spring biasing being such as to require a centrifugal pull in excess of the weight of the aeroplane for causing the outward extension of the said additional gear.

7. Apparatus according to claim 4, comprising spring biased means for connecting the attachment gear to the arm, the said arm being pivotally connected to the mast for movement in a vertical plane, the resistance of the spring biasing means increasing in proportion to the outward movement of the attachment gear.

8. Apparatus according to claim 4, comprising means for resisting the outward extension of the attachment gear, and means for regulating the mean resistance of the said resistance means in accordance with the weight of the aeroplane to be handled and in accordance with the centrifugal force which must be resisted.

9. Apparatus according to claim 4, comprising means for resisting the outward extension of the attachment gear and means for regulating the said resistance means to resist a tension from 10% about to 200% of the weight of the aeroplane.

10. Apparatus according to claim 4, wherein the elastic means are adapted to increase to effective radius of the arm to an extent of from 1½ to 1¾ of the length of the arm and comprising spring biased means for resisting the outward extension of the said additional gear.

11. Apparatus according to claim 4, comprising spring biased means connecting the attachment gear and the said arm, and a multiple block tackle between the springs and the attachment gear, whereby the aeroplane may be paid out to an extent exceeding the extension of the springs under the pull applied to them by the aeroplane by a ratio depending on the tackle ratio.

12. Apparatus according to claim 4, comprising stops having spring-buffing means, for limiting the outward extension of the attachment gear.

13. Apparatus according to claim 4, comprising a spring connected to the said elastic means, a swivel for preventing the twisting of the elastic means upon revolution of the pivoted arm, a stop on the cable adjacent the outer end thereof for limiting the outer movement of the attachment gear, and a winch for placing a predetermined tension on the said spring, whereby the tension may be adjusted to suit the weight of the aeroplane to be handled so that the said attachment will not extend outwardly unless the predetermined tension is exceeded.

14. Apparatus for dispatching an aeroplane according to claim 1, comprising a telescopic extensible part in the said arm capable of increasing the length of the arm, the said aeroplane engaging means being carried on the outer end of the said telescopic portion.

15. Apparatus for dispatching or landing an aeroplane according to claim 1, comprising a telescopic portion in the said arm, and spring biased means for controlling the outward extension of the said attaching means, the said spring biased means being attached to the said telescopic portion.

16. Apparatus according to claim 1, comprising a telescopic portion in the said arm and means for determining the pull necessary to cause the extension of the said attaching means.

17. Apparatus according to claim 1, comprising a telescopic portion on the said arm and means for holding a telescopic portion, after its extension into its extended position.

18. Apparatus according to claim 1, in which the arm is pivoted to the mast for movement in a vertical plane, and comprising a telescopic part on the said arm, a holding device for holding the telescopic portion in its extended position and means for preventing the actuation of the holding device until the pivoted arm has swept outwardly through a selected vertical angle, and which will trip the holding device to permit the retraction of the telescopic portion when the arm falls below the said selected angle.

19. Apparatus according to claim 1, comprising a telescopic portion for the said arm, means for raising the said arm to a substantially horizontal position, means operable as a result of the actuation of the said last-mentioned means for causing the extension of the telescopic portion for the reception of an aeroplane to be landed and holding device for retaining the telescopic arm in its extended position.

20. Apparatus for landing or dispatching an aeroplane comprising a landing mast, an arm pivotally carried by the said mast and rotatable thereabout, the said arm also being movable through a vertical angle, an aeroplane engaging device on the end of the said arm, flexible means extending through the length of the arm, and connecting the engaging device to the said arm, spring biased means tending to restrain the extension of the said engaging device, the spring biasing being such that when the centrifugal force is low the arm will be folded close to the mast, but whereby, when the centrifugal force is increased the mast will approach an extended, horizontal position, the said flexible means feeding the engaging device outwardly upon increase of the centrifugal force.

21. Apparatus according to claim 1 in which the engaging device comprises a widely extending cable, and spring biased means for normally keeping the cable loop in its open position, but which loop lengthens under the stress occasioned by the attachment of an aeroplane thereto.

22. The combination with flexible extension gear on aeroplane landing or dispatching apparatus according to claim 1, of engaging gear on the aeroplane adapted to cooperate therewith, the said flexible extension gear comprising a ring or loop, the engaging gear on the aeroplane comprising a ring-engaging means adapted to enter the ring or loop on the extension gear, means for securely attaching or engaging the said ring or loop after the ring-engaging means has attached thereto, and a catch for preventing the aeroplane from accidentally breaking away from the said ring or loop.

23. The combination with flexible extension gear on dispatching or landing apparatus for aeroplanes according to claim 1, of engaging gear on the aeroplane adapted to cooperate with the extension gear on the landing mast, the said engaging gear comprising spring biased grappling means and an indicator in combination therewith to visualize to the aeroplane's pilot the stress on the spring biasing, whereby to indicate when the stress has been sufficiently reduced in order to enable the aeroplanes to be cast off with safety.

In testimony whereof I hereto affix my signature this 22nd day of May, 1929.

LIONEL HOLLAND.